US009031569B2

United States Patent
Kwon et al.

(10) Patent No.: US 9,031,569 B2
(45) Date of Patent: May 12, 2015

(54) METHOD FOR IDENTIFYING A MBSFN SUBFRAME AT A USER EQUIPMENT (UE) IN A WIRELESS COMMUNICATION SYSTEM

(75) Inventors: Yeong Hyeon Kwon, Anyang-si (KR); Kyu Jin Park, Anyang-si (KR); Han Gyu Cho, Anyang-si (KR); Jae Hoon Chung, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 230 days.

(21) Appl. No.: 13/145,519

(22) PCT Filed: Mar. 23, 2010

(86) PCT No.: PCT/KR2010/001782
§ 371 (c)(1),
(2), (4) Date: Jul. 20, 2011

(87) PCT Pub. No.: WO2010/110584
PCT Pub. Date: Sep. 30, 2010

(65) Prior Publication Data
US 2011/0275363 A1    Nov. 10, 2011

Related U.S. Application Data
(60) Provisional application No. 61/162,678, filed on Mar. 24, 2009.

(51) Int. Cl.
*H04W 72/00*  (2009.01)
*H04W 48/18*  (2009.01)
*H04L 5/00*   (2006.01)

(52) U.S. Cl.
CPC ........... *H04W 48/18* (2013.01); *H04W 72/005* (2013.01); *H04L 5/00* (2013.01)

(58) Field of Classification Search
CPC .... H04W 88/02; H04W 16/14; H04W 72/005
USPC ........ 455/422.1, 454, 450; 370/312, 328, 329
See application file for complete search history.

(56) References Cited

U.S. PATENT DOCUMENTS

2009/0319903 A1*  12/2009  Alanara ................. 715/733
2009/0323574 A1*  12/2009  Koskinen et al. ........... 370/312
(Continued)

FOREIGN PATENT DOCUMENTS

KR   10-2006-0091525 A    8/2006
WO   WO 2006/088301 A1    8/2006
(Continued)

*Primary Examiner* — Patrick Edouard
*Assistant Examiner* — Chuck Huynh
(74) *Attorney, Agent, or Firm* — Birch, Stewart, Kolasch & Birch, LLP

(57) ABSTRACT

A method for identifying a MBSFN (Multimedia Broadcast multicast service Single Frequency Network) subframe at a user equipment (UE) in a wireless communication system is disclosed. Receiving module may receive receiving a subframe type information from an base station (BS). Receiving module may receive type information of the MBSFN subframe. The identifying module may identify an index of a MBSFN subframe based on the received subframe type information. The identifying module may identify a type of the MBSFN subframe based on the received type information of the MBSFN subframe. Decoding module may decode only a physical control channel region of the MBSFN subframe based on the identified type of the MBSFN subframe. Alternatively, Decoding module may decode the MBSFN subframe if the identified type of the MBSFN subframe is a decodable type or a known type.

12 Claims, 5 Drawing Sheets

(56) References Cited

U.S. PATENT DOCUMENTS

2010/0097972 A1* 4/2010 Parkvall et al. .............. 370/312
2010/0214972 A1* 8/2010 Che et al. .................... 370/315
2010/0272004 A1* 10/2010 Maeda et al. ................ 370/312
2011/0103338 A1* 5/2011 Astely et al. ................. 370/329

FOREIGN PATENT DOCUMENTS

| WO | WO 2008/115614 A2 | 9/2008 |
| WO | WO 2008/137354 A1 | 11/2008 |

* cited by examiner

METHOD FOR IDENTIFYING A MBSFN SUBFRAME AT A USER EQUIPMENT (UE) IN A WIRELESS COMMUNICATION SYSTEM

CROSS REFERENCE TO RELATED APPLICATIONS

This application is the National Phase of PCT/KR2010/001782 filed on Mar. 23, 2010, which claims priority under 35 U.S.C. 119(e) to U.S. Provisional Application No. 61/162,678 filed on Mar. 24, 2009, all of which are hereby expressly incorporated by reference into the present application.

FIELD OF THE INVENTION

The present invention relates to wireless communication, more specially, the present invention relates to method for identifying a MBSFN subframe at a user equipment (UE) in a wireless communication system.

BACKGROUND ART

In 3GPP (3rd Generation Partnership Project) specification, there are two basic subframe types. One type is unicast subframe and the other type is MBSFN (Multimedia Broadcast multicast service Single Frequency Network) subframe.

Unicast subframe is used for data and control channel transmission to specific UE so that one-to-one communication may be performed between eNB and UE.

On the contrary, the MBSFN subframe is used for broadcasting signals which includes data and a control channel to targeted multiple receivers (e.g., UE).

In the MBSFN subframe, a Release-8 UE does not know about the MBSFN subframe structure except the first control channel part (length is indicated by PCFICH (Physical control format indicator channel)). Thus, the method for identifying a MBSFN subframe at the Release-8 UE is required.

Meanwhile, the MBMS feature is introduced into Release-9 specification, and thus a Release-9 UE needs to decode the MBSFN subframe. However, since the feature of MBMS is just one of the targeting subframe types, this MBSFN subframe is not defined as single subframe type. For example, as with dual cell/dual stream beamforming, a Release-9 UE may operate in a different operation mode with legacy UE while achieving better throughput via MBSFN configuration.

In addition, LTE-A system (Release-10 or later system) may employ various new features considering higher order MIMO, CoMP (Coordinated Multi-Point), Relay, and so on. Thus, additional new subframe types are required.

However, a method for indicating MBSFN subframe and MBSFN subframe type to release-8 UE, release-9 UE, and LTE-A UE are not studied yet.

SUMMARY OF THE INVENTION

Accordingly, the present invention is directed to a method for identifying a MBSFN (Multimedia Broadcast multicast service Single Frequency Network) subframe at a user equipment (UE) in a wireless communication system that substantially obviates one or more problems due to limitations and disadvantages of the related art.

To achieve these objects and other advantages and in accordance with the purpose of the invention, as embodied and broadly described herein, a method for identifying a MBSFN (Multimedia Broadcast multicast service Single Frequency Network) subframe at a user equipment (UE) in a wireless communication system, the method includes receiving a subframe type information from an base station (BS); and identifying an index of a MBSFN subframe based on the received subframe type information.

Also, the method may further include receiving type information of the MBSFN subframe; and identifying a type of the MBSFN subframe based on the received type information of the MBSFN subframe.

In this case, the method may further include decoding the MBSFN subframe if the identified type of the MBSFN subframe is a decodable type or a known type. Alternatively, the method may further include decoding only a physical control channel region of the MBSFN subframe, or at least one OFDM (Orthogonal frequency-division multiplexing) symbol excluding a traffic part of the identified MBSFN subframe if the identified type of the MBSFN subframe is a undecodable type or a unknown type.

In another aspect of the present invention, a user equipment (UE) for receiving a signal in a wireless communication system, the UE includes a receiving module for receiving a subframe type information from an base station (BS); and an identifying module for identifying an index of a MBSFN subframe based on the received subframe type information.

Also, the UE further includes a receiving module for receiving type information of the MBSFN subframe; and an identifying module for identifying a type of the MBSFN subframe based on the received type information of the MBSFN subframe.

In this case, the UE may further include a decoding module for decoding the MBSFN subframe if the identified type of the MB SFN subframe type is a decodable type or a known type. Alternatively, the UE may further include a decoding module for decoding only a physical control channel region of the MBSFN subframe, or at least one OFDM (Orthogonal frequency-division multiplexing) symbol excluding a traffic part of the identified MBSFN subframe if the identified type of the MBSFN subframe is a undecodable type or a unknown type.

The UE may further include a decoding module for decoding only a physical control channel region of the MBSFN subframe based on the identified type of the MBSFN subframe.

Preferably, the subframe type information is received via a RRC (Radio Resource Control) signaling.

Preferably, the type information of the MBSFN subframe information is received via a specific region of a downlink control channel, or a predefined control channel for MBMS (Multimedia Broadcast multicast service) transmission.

According to various embodiments of the present invention,

Release-8 UE, Release-9 UE, and LTE-A UE can efficiently decode a MBSFN subframe. Thus, performance and throughput of the UE can be improved.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
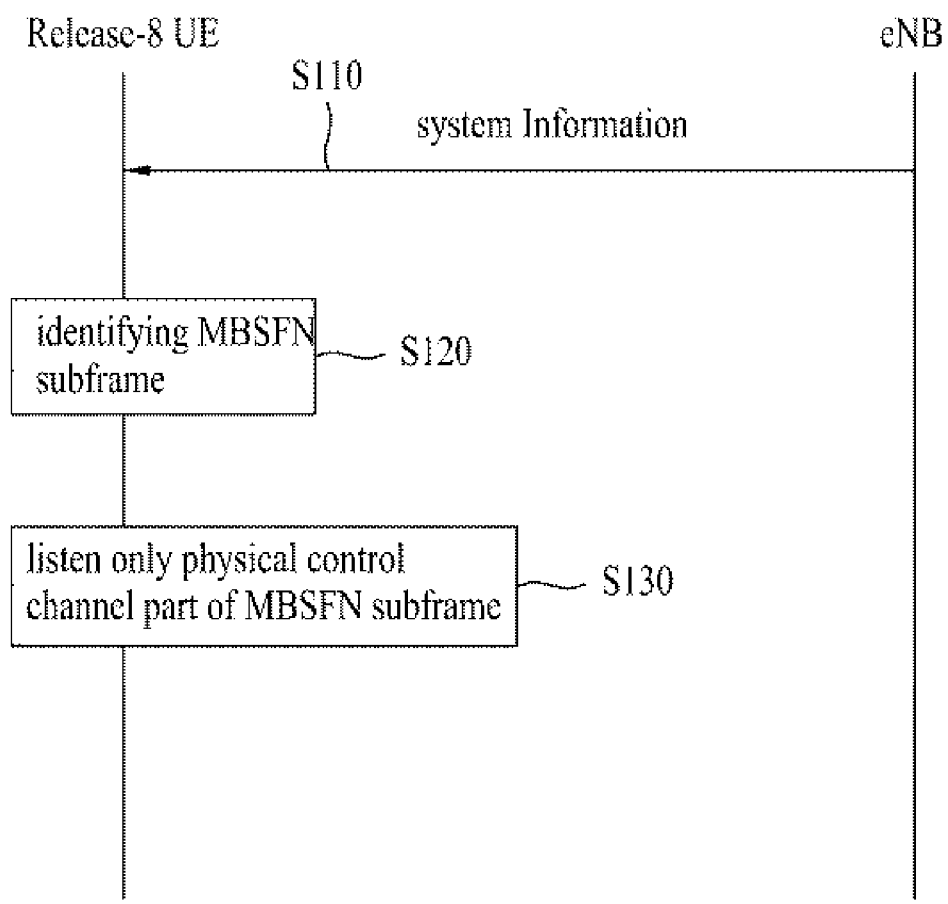
FIG. 1 is an example procedure for identifying a received subframe type at a Release-8 UE.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as an IEEE 802.16 system, but the present invention is not limited thereto and the remaining parts of the present invention other than unique characteristics of the IEEE 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a user equipment (UE) may include mobile or fixed advanced mobile stations (AMSs), for example, a mobile station (MS) and the like. Also, the base station (BS) may refer to an arbitrary node of a network end which communicates with the above terminal, and may include a Node B (Node-B), an eNode B (eNode-B), eNB, and an access point (AP) and the like.

In a mobile communication system, the UE may receive information from the Node B via a downlink, and may transmit information via an uplink. The information that is transmitted and received to and from the UE includes data and a variety of control information. There are a variety of physical channels according to categories of transmission (Tx) and reception (Rx) information of the UE.

The present invention discloses various methods for identifying MBSFN subframe and MBSFN subframe type (MBSFN subframe configuration information) at a user equipment (e.g., release-8 UE, release-9 UE, LTE-A UE, and so on) according to the UE-type or class.

There are several classes which interpret the MBSFN subframes as different subframe. The different interpretation may be a true MBMS subframe, relay backhaul subframe, LTE-A subframe, Release-9 subframe, and so on. Due to different subframe types with the same MBSFN (Multimedia Broadcast multicast service Single Frequency Network) signaling, the method and procedure to identify a MBSFN subframe and MBSFN subframe type at a user equipment (UE) is required.

The MBSFN subframe configuration is defined as a bitmap for the unicast subframe which may be defined as MBSFN subframe by RRC (Radio Resource Control) signaling.

The operation of Release-8 UE is simplified by a simple indication that RRC configuration includes which subframes are MBSFN subframes and which subframes are not in the form of a bitmap except for the special subframes such as 0, 4, 5, 9 (FDD) subframe index of every radio frame.

On the contrary, for example, when an eNB tries to set subframe with index 1 (zero-based index) to MBSFN subframe, the only required setting for the Release-8 UE is the toggling of corresponding bit value to one.

The Release-8 UE may not listen from the corresponding MBSFN subframe any decodable or readable signal part except the unicast control region which is defined with PCFICH (Physical Control Format Indicator Channel) value. Therefore, the eNB may easily differentiate the subframe type for the Release-8 UEs.

FIG. 1 is an example procedure for identifying a received subframe type at a Release-8 UE.

Referring to FIG. 1, the Release-8 UE may receive system information which defines subframe types from an eNB S110. That is, the system information may include an indication which subframe is a MBSFN subframe. The Release-8 UE may identify the subframe indices which are defined as a MBSFN subframe using the received system information (S120). Then, the Release-8 UE may decode and listen only to the physical control channel part of the MBSFN subframes (S130). The system information may be transmitted via RRC (Radio Resource Control) signaling from an eNB.

However, for a Release-9 UE or later UE, the UE may decode and listen to the MBSFN subframe if the corresponding subframe is decodable to itself.

For example, a true MBMS (Multi Broadcasting Multicast Service) message may exist within the MBSFN subframe and a UE may try to decode the signal traffic to receive MBMS contents. Since a Release-9 UE or later UE may want to listen to the MBSFN subframe, it is preferable to provide measures including any advanced feature in later releases specification. In addition to MBMS broadcast, there is a dual-cell/dual stream operation which is defined as subframe specific operation.

Therefore, the total MBSFN type required for Release-9 or later UE may be at least 2 types (MBMS, dual cell/dual stream, etc) or at least 3 types (MBMS, dual cell/dual stream, relay backhaul, CoMP, etc).

It is noted that the total number of MBSFN subframe types and the subframe type definitions may be different depending on the system specification (LTE Release 8, LTE Release-9, LTE-A, etc).

Figure 2:
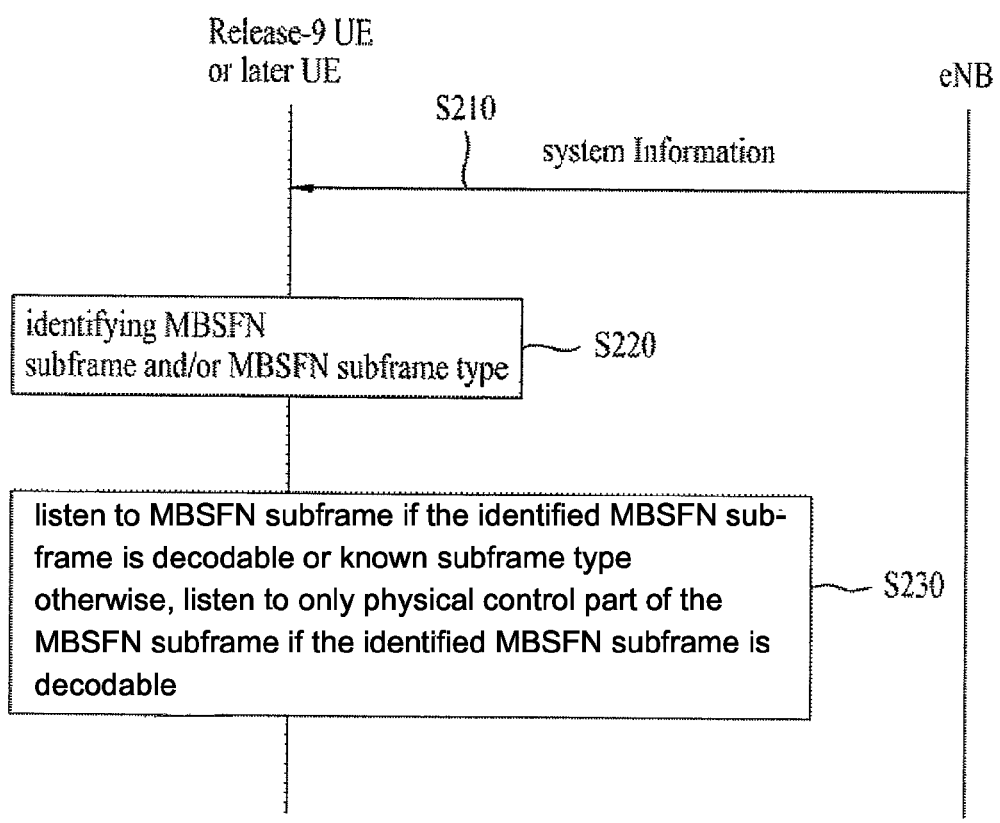
FIG. 2 is an example procedure for identifying a received subframe type at a Release-9 UE or later UE.

FIG. 2 is an example procedure for identifying a received subframe type at a Release-9 UE or later UE.

Referring to FIG. 2, the Release-9 UE or later UE may receive system information which defines subframe types from an eNB (S210). That is, the system information may include an indication which subframe is the MBSFN subframe. Then, the Release-9 UE or later UE may identify a MBSFN subframe and/or MBSFN subframe type which are known to itself such as MBMS, dual cell/dual stream, CoMP, relay, etc (S220). Additional information about the type of MBSFN subframe may be obtained from system information or a control channel. The Release-9 UE or later UE may listen and decode corresponding MBSFN subframes if the identified MBSFN subframe type is the decodable or known subframe types for the Release-9 UE or later UE (S230).

Otherwise, the Release-9 UE or later UE may listen and decode only the physical control channel part of the corresponding MBSFN subframe if the identified MBSFN subframe type is not known or undecodable to the Release-9 UE or later UE (S230).

Release-10 UE or later (e.g., LTE-A) UE may listen and decode the Release-9 subframes and newly defined subframes which will be included in the future releases. LTE-A UE also may behave the same way as previous Release-8 UE or Release-9 UE about the identification of MBSFN subframe, since the corresponding message is already defined in the system message.

For the LTE-A system, there are several extended MBSFN subframe types such as relay backhaul subframe, CoMP subframe, or LTE-A high order MIMO operation subframe, etc. Among the extended MBSFN subframe types, the relay backhaul subframe is used to communicate between an eNB and an UE.

The relay backhaul subframe is a blank subframe so that relay may transmit only a unicast control channel part. A rest part excluding the unicast control channel part in the relay backhaul subframe is left empty intentionally. Therefore, LTE-A UE may not listen and decode he MBSFN subframe except for the control channel part.

If a high order MIMO feature is employed and a MBSFN subframe type is utilized for the definition, then additional CSI-RS (measurement RS) may be defined in this MBSFN subframe, where the CSI-RS (Channel State Information Reference Signal) may be located in the unicast control channel region, PDSCH (Physical Downlink Shared CHannel) region, or LTE-A only FDM segment which will be newly defined.

In this MBSFN subframe type, LTE-A UE may listen to the subframe, decode unicast traffic and measure the channel response whose result will be reported to the serving eNB or collaborating eNBs.

On the other hand, if the CoMP scheme is employed into the MBSFN subframe due to intersubcarrier interference or timing mismatch or collaborating cell's measurement purpose, then the LTE-A UE may measure and report several measurement results on the channel quality, timing alignment information, spatial information related with MIMO operations, and so on. In addition, the LTE-A UE may receive its own traffic from multiple transmission points.

The LTE-A UE may listen to system information including information about the MBSFN configuration. The information about the MBSFN configuration indicates which subframe is the MBSFN subframe. In this case, the MBSFN configuration information may be defined as Release-8 system.

The LTE-A UE may listen to system information or control channels which includes the additional information about the MBSFN subframe types which may be applied to MBSFN configured subframes.

The LTE-A UE may also listen to the system information or control channels which includes additional information on the newly defined MBSFN subframe types which is not defined in Release-9 but LTE-A system.

For a decodable/readable MBSFN subframe, the LTE-A UE needs to listen to the corresponding subframes and perform proper decoding and measurements. For non-decodable/unknown subframes, the LTE-A UE needs to read only the readable part such as the control channel part or the minimum number of OFDM symbols which is not defined as MBSFN traffic part.

Figure 3:
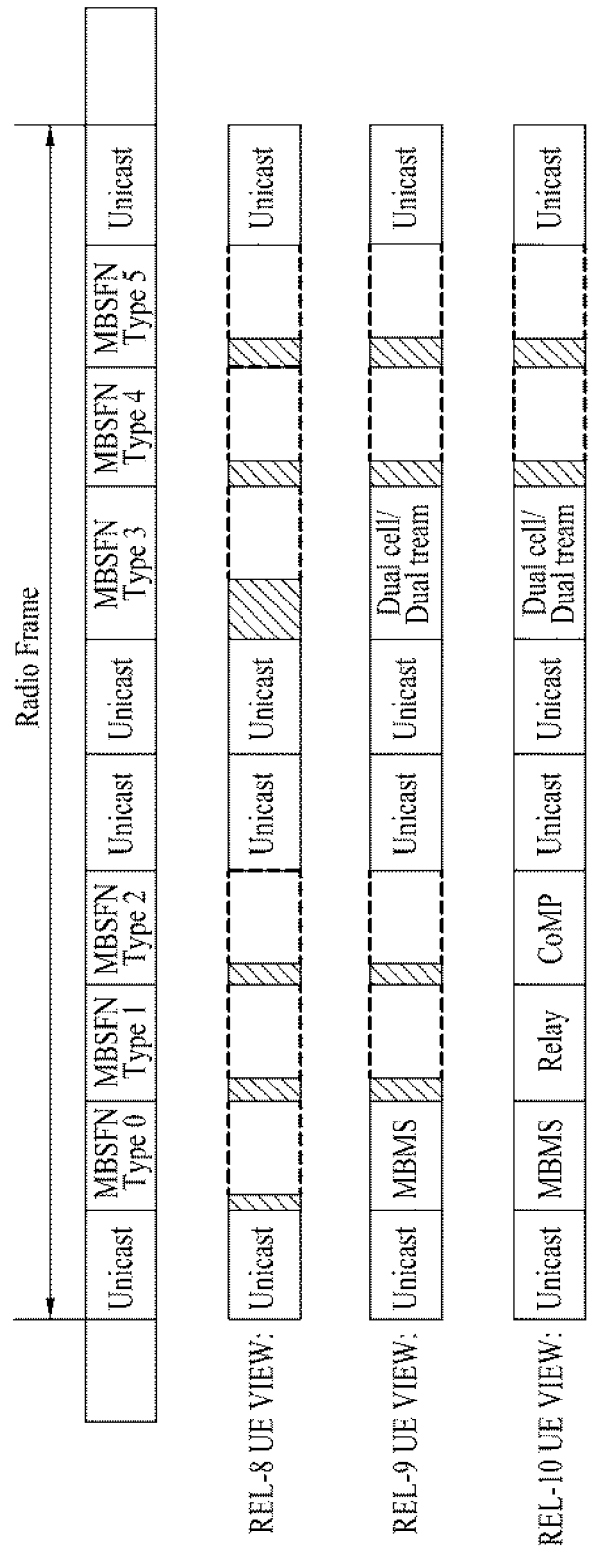
FIG. 3 is an example of subframe types according to specification version.

FIG. 3 is an example of subframe types according to specification version.

Referring to FIG. 3, one radio frame may include 10 subframes. The one radio subframe may include a unicast subframe type and MBSFN subframe type. In this case, the MBSFN subframe type may be divided into at least one type (e.g., MBSFN type 0, 1, 2, 3, 4 and 5).

As shown in FIG. 3, a Release 8-UE may view unicast subframes. However, the Release 8-UE does not know information about a MBSFN subframe. Thus, the Release 8-UE receives system information including information indicating a MBSFN subframe type. Then, the Release 8-UE may identify the index of the MBSFN subframe and decode only the physical control channel of the identified MBSFN subframe.

As shown in FIG. 3, a Release 9-UE may view unicast subframes and MBSFN subframes (e.g., MBMS subframe type and dual cell/dual stream subframe type).

The Release-9 UE receives system information including information indicating the MBSFN subframe type. Then, the Release 9-UE identifies the index of the MBSFN subframe. Then, the Release-9 UE identifies the MBSFN subframe type which is known to itself such as MBMS, dual cell/dual stream, CoMP, relay, etc. Additional information about the type of MBSFN subframe may be obtained from system information or a control channel. The Release-9 UE listens and decodes corresponding MBSFN subframes if the identified MBSFN subframe type is the decodable or known subframe types for the Release-9 UE.

Otherwise, the Release-9 UE listens and decodes only the physical control channel part of the corresponding MBSFN subframe if the identified MBSFN subframe type is not known or undecodable to the Release-9 UE.

LTE Release-8 specification defines the MBSFN subframe as a bitmap sequence which corresponds to unicast subframes in a radio frame, the total number of bits may be 24 (6*4) bits for 40 ms period. This is aligned with HARQ process period (8 ms) and radio frame period (10 ms).

Therefore, if the MBSFN subframe type information is semi-static information for system operation, the information for indicating the subframe type may be located into system information such as a RRC message. However, if the subframe type may be dynamically used by eNB and UEs, then the subframe type needs to be reconfigured on-demand and indicated on dynamic channel.

The dynamic channel may be allocated to a common search region which is a PDCCH (Physical Downlink Control Channel) region existing in every subframe or UE-specific search region which is private PDCCH region. However, an arbitrary UE ID may be indicated as for the control information indication.

For indicating MBSFN subframe types, a new control channel may reside in the PDSCH or Frequency Division Multiplexed subcarriers which is located out-side of a legacy subframe region during the same subframe time duration.

When the dynamic MBSFN subframe type indication is adopted, the control channel may be transmitted at the same MBSFN subframe or transmitted at prior to the corresponding MBSFN subframe so that the UE may have enough time to detect the subframe type of following subframes.

The possible indication combination may be as follows. For indicating Release-8 MBSFN subframe, a MBSFN subframe indication is transmitted via system information (e.g., RRC).

For indicating Release-9 MBSFN subframe, an indication of the MBSFN subframe type is transmitted via system information (RRC), or a Common search region in PDCCH, or a newly defined control channel for MBMS in PDSCH or PDCCH.

As shown in FIG. 3, a Release-10 UE may view a unicast subframe type, and a MBSFN subframe type (e.g., MBMS, relay, CoMP, dual cell/dual stream).

Figure 4:
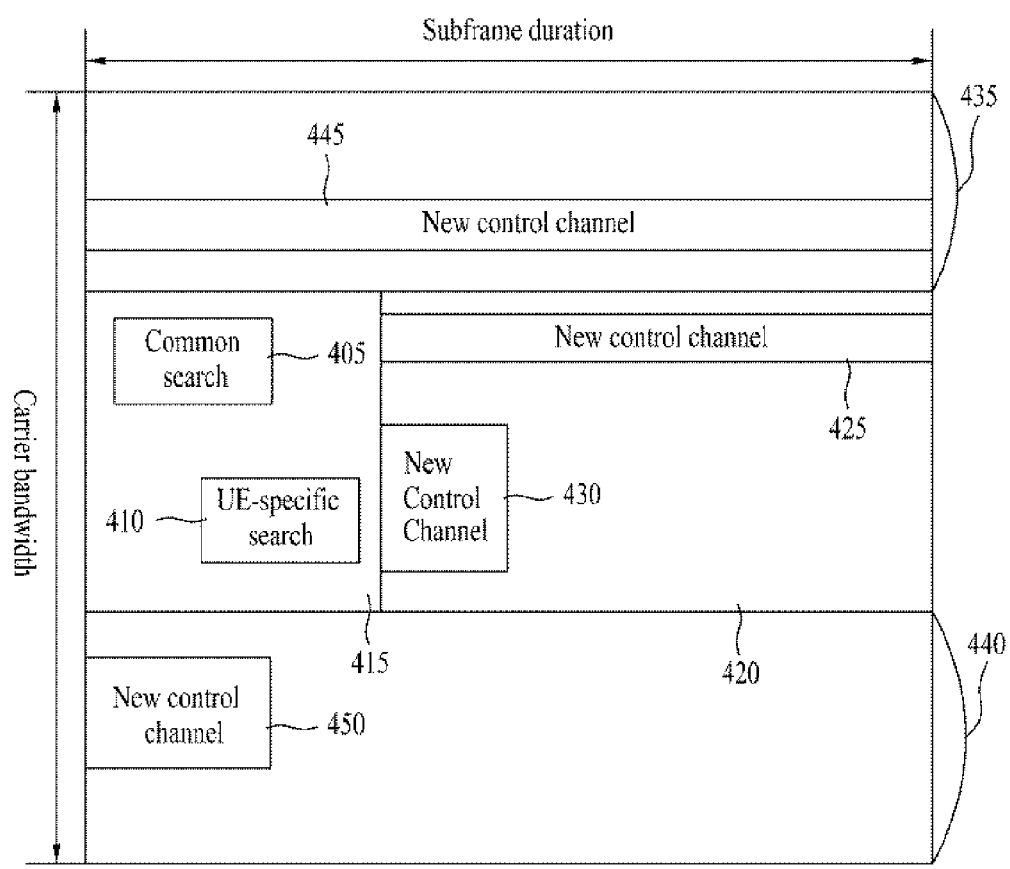
FIG. 4 shows an example of control channel forms which may be defined in the future 3GPP releases for control channel extensions.

FIG. 4 shows an example of control channel forms which may be defined in the future 3GPP releases for control channel extensions.

For indicating a Release-10 MBSFN subframe type or later (LTE-A) MBSFN subframe type, information about a MBSFN subframe type indication is transmitted via system information (e.g., RRC), or a Common search region 405 in PDCCH 415, or UE-specific search region 410 in PDCCH 415, or newly defined control channel 425, 430 for MBMS in PDSCH 420 or PDCCH 415, or new LTE-A control channel 425, 430, 445, or 450 which is located in PDSCH 420 or Frequency Division Multiplexed sub-carriers which is disjointed with LTE UEs (e.g., the subcarriers in the LTE-A segment 435, 440 which does not share with LTE-UE but exists in the same subframe time duration).

FIG. 4 shows several control forms which can be defined in the future 3GPP releases for control channel extensions. A control channel for the most straightforward design may be located in common-search region 405 and UE-specific region 410. However, due to blind decoding complexity and robustness issue, new control channel 425, 430 may be located in the shared channel region 420 in a manner of TDM (Time Division Multiplexing), FDM (Frequency Division Multiplexing), or hybrid of the TDM and the FDM, etc.

In this case, if the corresponding subframe is a MBSFN subframe, the newly designed subframe may be considered as a MBMS channel. If the corresponding subframe is interpreted as a feature enhanced subframe, then the control channel may be a Release-9 or LTE-A specific control channel for common information sharing or UE-specific control information.

On the other hand, if the load of LTE UEs becomes small compared to LTE-A traffic, then the legacy system bandwidth may occupy less than the carrier bandwidth. In this case, the remained subcarrier region may be defined as LTE-A only segment or LTE-A only zone, and control channel may be defined in a manner of TDM, FDM, or hybrid of the TDM and the FDM.

In this case, several control channels may be defined in the newly defined LTE-A only zone 435, 440 which may include the subframe type indication, control channel shape indication, UE grant information, common control information, inter-cell co-operation information, reference symbol definition, and so on.

It is noted that the type definition of MBSFN may be applied to an extension component carrier, which may be introduced into LTE-A or later releases. That is, the subframe type on extension component carrier may be defined as special subframes so that behavior of UE may be controlled on the basis of subframes. In this case, by defining access priority/class for each subframe type, the system may be easily enhanced over new LTE-A releases. In such case, the interpretation behavior disclosed above may be applied similarly.

As described above, according to the present invention, the MBSFN subframe indication is facilitated without UE ambiguity on the future releases. In addition, the proposed methods will promote the MBSFN subframe usage to enhance system throughput and inter-cell operations.

Figure 5:
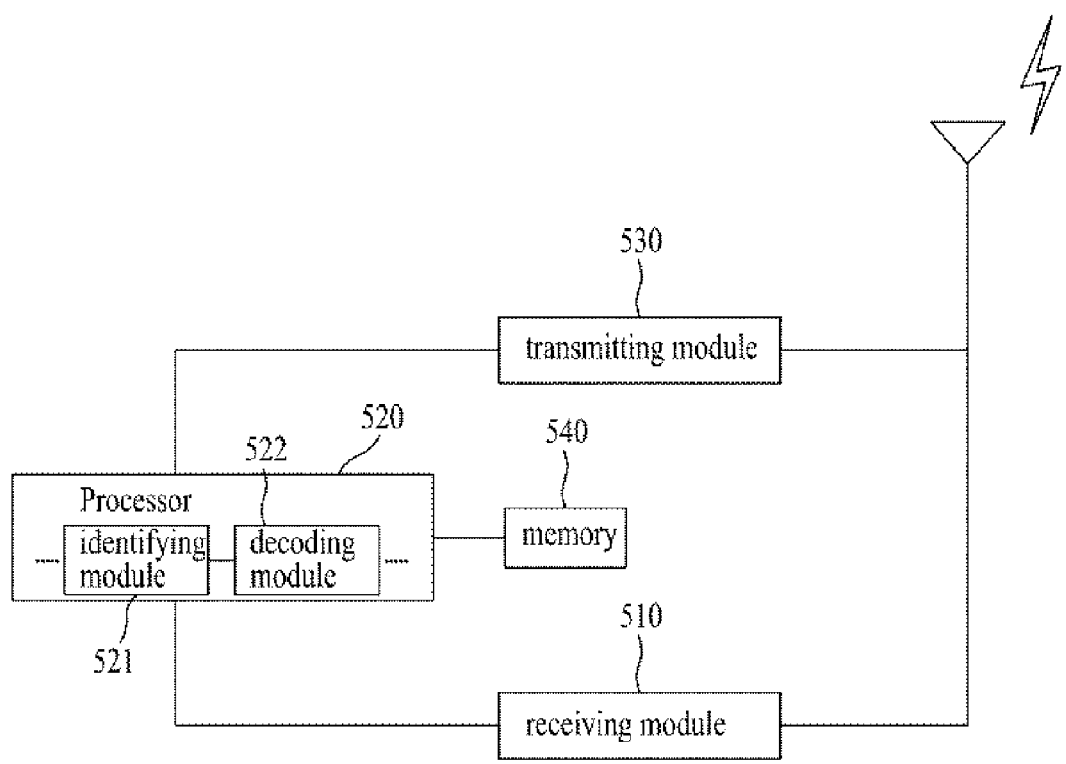
FIG. 5 is a diagram for configuration of a user equipment apparatus according to one preferred embodiment of the present invention.

FIG. 5 is a diagram for configuration of a user equipment apparatus according to one preferred embodiment of the present invention.

Referring to FIG. 5, the UE may include a receiving module 510, processor 520, a transmitting module 530, and memory 540.

The receiving module 510 may receive a subframe type information from a base station (BS). The receiving module 510 may receive type information of the MBSFN subframe.

Processor 520 may include a identifying module 521 and a decoding module 522.

The identifying module 521 may identify an index of a MBSFN subframe based on the received subframe type information. The identifying module 521 may identify a type of the MBSFN subframe based on the received type information of the MBSFN subframe.

The decoding module 522 may decode only a physical control channel region of the MBSFN subframe based on the identified type of the MBSFN subframe.

The decoding module 522 may decode the MBSFN subframe if the identified type of MBSFN subframe is a decodable type or a known type. Alternatively, the decoding module 522 may decode only a physical control channel region of the MBSFN subframe or at least one OFDM (Orthogonal frequency-division multiplexing) symbol excluding a traffic part of the identified MBSFN subframe if the identified type of the MBSFN subframe type is a undecodable type or a unknown type.

The receiving module 510 and the transmitting module 530 are coupled to the processor 520 and receive and/or transmit radio signals.

The memory 540 may information calculated in the processor 520 for a predetermined period of time, and may be replaced with a buffer (not shown) or the like.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

A method for identifying a MBSFN (Multimedia Broadcast multicast service Single Frequency Network) subframe at a user equipment (UE) in a wireless communication system is applicable to IEEE 802.16m, 3GPP LTE system, and like that.

The invention claimed is:

1. A method of processing a MBSFN (Multimedia Broadcast multicast service Single Frequency Network) subframe at a user equipment (UE) in a wireless communication system, the method comprising:
   receiving, by the UE from a base station (BS), information on a MBSFN subframe index indicating a subframe corresponding to the MBSFN subframe;
   receiving, by the UE from the BS, information on a type of the MBSFN subframe which indicates a usage of the MBSFN subframe, when the UE supports at least one type among a plurality of MBSFN subframe types;
   determining a region of the MBSFN subframe to be decoded based on whether the type of the MBSFN subframe is supported by the UE, using the MBSFN subframe index and the type of the MBSFN subframe; and
   decoding only a non-MBSFN region within the MBSFN subframe, when the UE does not support the type of the MBSFN subframe,
   wherein the non-MBSFN region contains unicast control information for the UE, and
   wherein the information on the MBSFN subframe index is configured as a bitmap and received via a RRC (Radio Resource Control) signaling.

2. The method of claim 1, wherein the MBSFN subframe index is one of 1, 2, 3, 6, 7 and 8 for a Frequency Division Duplex (FDD) scheme.

3. The method of claim 1, further comprising:
   decoding the entire region of the MBSFN subframe when the type of the MBSFN subframe is supported by the UE.

4. The method of claim 1, further comprising:
   decoding only the non-MBSFN region, if the type of the MBSFN is supported, but the type of the MBSFN is a relay backhaul type.

5. The method of claim 1, wherein the information on the type of the MBSFN subframe is received via a specific region of a downlink control channel, or a predefined control channel for MBMS (Multimedia Broadcast multicast service) transmission.

6. The method of claim 5, wherein the downlink control channel is a PDCCH (Physical Downlink Control CHannel), and the specific region of the downlink control channel is a common search region or a UE-specific search region of the PDCCH.

7. The method of claim 1, wherein the usage of the MBSFN subframe is one of Multimedia Broadcast Multicast System (MBMS) operation, Coordinated MultiPoint (CoMP) operation, Multi-Input-Output (MIMO) operation, reference signal measurement and relay backhaul transmission.

8. A user equipment (UE) for processing a MBSFN (Multimedia Broadcast multicast service Single Frequency Network) subframe in a wireless communication system, the UE comprising:
   a receiving module configured to receive, from a base station (BS), information on a MBSFN subframe index indicating a subframe corresponding to the MBSFN subframe and to receive from the BS, information on a type of the MBSFN subframe which indicates a usage of the MBSFN subframe, when the UE supports at least one type among a plurality of MBSFN subframe types; and a processor configured to determine a region of the MBSFN subframe to be decoded based on whether the type of the MBSFN subframe is supported by the UE using the MBSFN subframe index and the type of the MBSFN subframe, and to decode only a non-MBSFN region within the MBSFN subframe when the UE does not support the type of the MBSFN frame,
   wherein the non-MBSFN region contains unicast control information for the UE, and
   wherein the information on the MBSFN subframe index is configured as a bitmap and is received via a RRC (Radio Resource Control) signaling.

9. The UE of claim 8, wherein the MBSFN subframe index is one of 1, 2, 3, 6, 7 and 8 for a Frequency Division Duplex (FDD) scheme.

10. The UE of claim 8, wherein the processor decodes the entire region of the MBSFN subframe when the type of the MBSFN subframe is supported by the UE.

11. The UE of claim 8, wherein the information on the type of the MBSFN subframe is received via a specific region of a downlink control channel, or a predefined control channel for MBMS (Multimedia Broadcast multicast service) transmission.

12. The UE of claim 11, wherein the downlink control channel is a PDCCH (Physical Downlink Control CHannel), and the specific region of the downlink control channel is a common search region or a UE-specific search region of the PDCCH.

* * * * *